United States Patent [19]

Stevens

[11] Patent Number: 4,945,940

[45] Date of Patent: Aug. 7, 1990

[54] TAMPER PROOF BACKFLOW PREVENTION ASSEMBLY

[76] Inventor: Robert B. Stevens, P.O. Box 26284, Honolulu, Hi. 96825

[21] Appl. No.: 396,113

[22] Filed: Aug. 21, 1989

[51] Int. Cl.[5] ............................................. F16K 24/00
[52] U.S. Cl. .................................. 137/218; 137/382.5
[58] Field of Search ............................. 137/382.5, 218; 251/292

[56] References Cited

U.S. PATENT DOCUMENTS

| 275,727 | 4/1883 | Sommer | 137/382.5 |
| 795,027 | 7/1905 | Connell | 137/382.5 |
| 1,278,813 | 9/1918 | Weaver | 251/144 |
| 1,322,197 | 11/1919 | Molinari | 137/382.5 X |
| 3,173,439 | 3/1965 | Griswold et al. | 137/218 X |

Primary Examiner—Gerald A. Michalsky

[57] ABSTRACT

A testable backflow prevention assembly provided with a means for preventing unauthorized access to water within the assembly throughout the differential pressure gradient of the assembly; comprising: a means for locking the valves of the test cocks, a means for lockably securing the test cocks to the backflow prevention assembly body, and a means for preventing cessation of water pressure within the backflow prevention assembly.

9 Claims, 5 Drawing Sheets

TAMPER PROOF BACKFLOW PREVENTION ASSEMBLY

BACKGROUND OF THE INVENTION

1. Field of Invention

This invention relates to testable potable water backflow prevention assemblies and the risk of contamination to a potable water supply they pose by virtue of the differential pressure gradient inherent to these devices and the ease with which one may access the water along the differential pressure gradient. This invention prevents unauthorized access to the potable water supply along the differential pressure gradient of testable backflow prevention assemblies.

2. Description of the Prior Art

Testable backflow prevention devices are installed on potable water lines to prevent contamination of the drinking water supply. They are commonly installed after the water meter serving facilities such as high-rise buildings, shopping malls, hospitals, schools, airports, dairies, bottling plants, farms, laboratories, pharmaceutical plants, nursing homes, military bases and commercial and industrial complexes.

Testable backflow prevention devices work by means of multiple check valves and, often, additional devices. There is a differential pressure across any properly operating check valve assembly. Test cocks are located before and after each check valve in testable devices; so as to make sure they are operating properly and will prevent backflow of potentially contaminated water. Although test cocks are intended only for testing the device, and then only by authorized technicians, their significance and function is not generally understood. It is common to see hose bibs and other connections made directly to the test cocks; although such connections are strictly prohibited by water purveyors. These devices are sometimes by-passed, either intentionally or inadvertantly, by connecting two or more test cocks by a common hose or pipe. The hazard of such connections is generally not perceived but is usually substantial. This "Tamper-Proof Backflow Prevention Assembly" is specifically designed to mitigate this hazard as well as provide a suitable level of backflow prevention.

U.S. Pat. No. 3,173,439 to D. G. Griswold et al, shows the operation of a reduced pressure principle backflow preventer; generally considered a very protective type of testable backflow prevention device. There is a differential pressure gradient along this type of backflow prevention assembly and three of the four test cocks along this device will show a different level of pressure. U.S. Pat. No. 3,724,487, to Hunter, and U.S. Pat. No. 3,918,477, to Grams, are examples of some other backflow prevention assemblies.

The concept of safety sealing is not new. U.S. Pat. No. 2,069,849 to P. Rich, illustrates a protector cap for a spigot. With respect to security, locking devices of all sorts have been made; including the mortise and tenon types used to lock such things as automobile wheel rims to fire hydrant caps. More applicable to this patent application is U.S. Pat. No. 3,090,218 to H. A. Birkness. However the application and type of "Locked Safe Valve" of H. A. Birkness is substantially different in several respects. Most notably, it is not specific to or made a part of a backflow prevention assembly. Furthermore, it covers only a specific type of valve and locking mechanism, not found in backflow prevention assembly test cocks or this application.

My previous U.S. patent application titled "Water Access Preventer", Ser. No. 254,574, Filed Oct. 7, 1988, now U.S. Pat. No. 4,878,515, is the first to address the subject of mitigating the risk of contamination of potable water within testable backflow prevention assemblies. The "Water Access Preventer" is a retrofit device for existing testable backflow prevention assemblies. Unlike my previous "Water Access Preventer", this new patent application is for a totally new, and complete, tamper-proof, backflow prevention assembly. Disclosure document No. 211783 of September 1988 discloses essential elements of the "Water Access Preventer" mentioned above as well as this new "Tamper-Proof Backflow Prevention Assembly."

SUMMARY OF THE INVENTION

An object of the invention is to prevent unauthorized access to the water within a testable backflow prevention assembly.

A further object of the invention is to prevent siphonage of contaminated fluid into the drinking water supply.

A further object of the invention is to prevent contamination of a potable water line.

A further object of the invention is to prevent unauthorized use of water.

A further object of the invention is to maintain pressure throughout the differential pressure gradient of a testable backflow prevention assembly.

A further object of the invention is to prevent discharge of water through improper shut-off of a testable backflow prevention assembly.

A further object of the invention is to prevent theft of all or part of a testable backflow prevention assembly.

A further object of the invention is to be inconspicuous.

Other objects and advantages of the invention will become apparent from the following description.

BRIEF DESCRIPTION OF THE DRAWINGS

In order that the invention may be more readily understood, reference will now be made to the accompanying drawings which show one embodiment thereof by way of example and in which.

DESCRIPTION OF THE PREFERRED EMBODIMENT

Before explaining the present invention in detail it is to be understood that the invention is not limited in its application to the accompanying drawings, since the invention is capable of other embodiments and of being practiced or carried out in various ways. Also, it is to be understood that the phraseology or terminology employed herein is for the purpose of description and not limitation.

Figure 1:
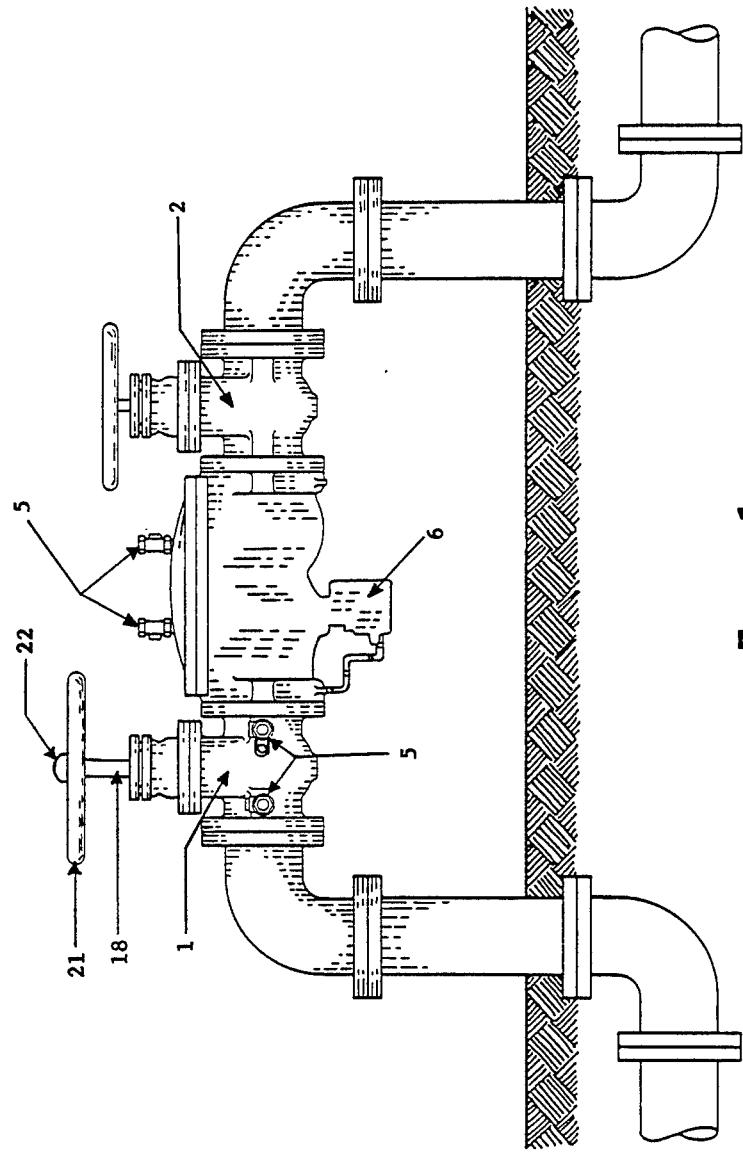
FIG. 1 is a front elevation view showing a typical installation.
Figure 2:
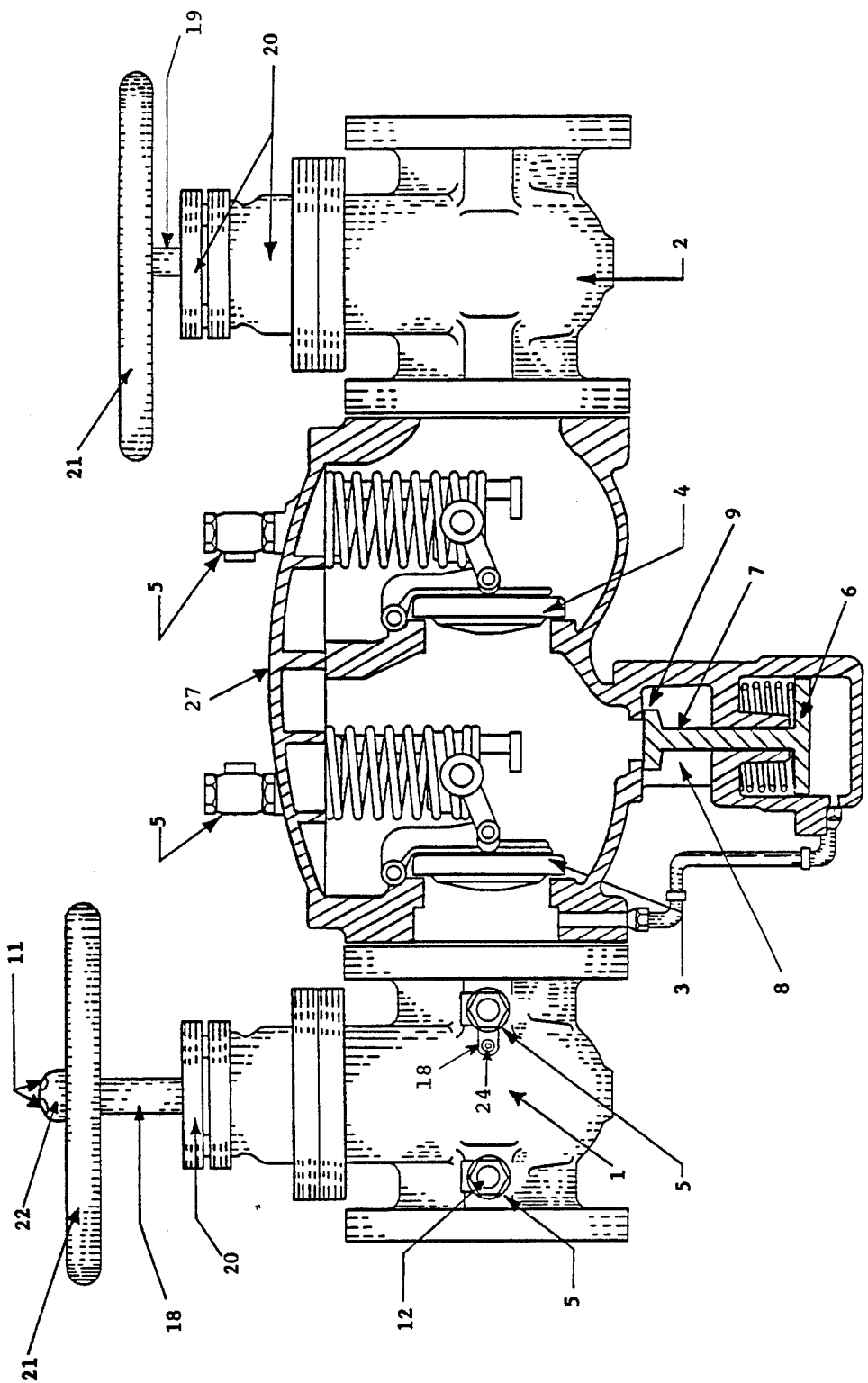
FIG. 2 is a front elevation view in partial section.
Figure 3:
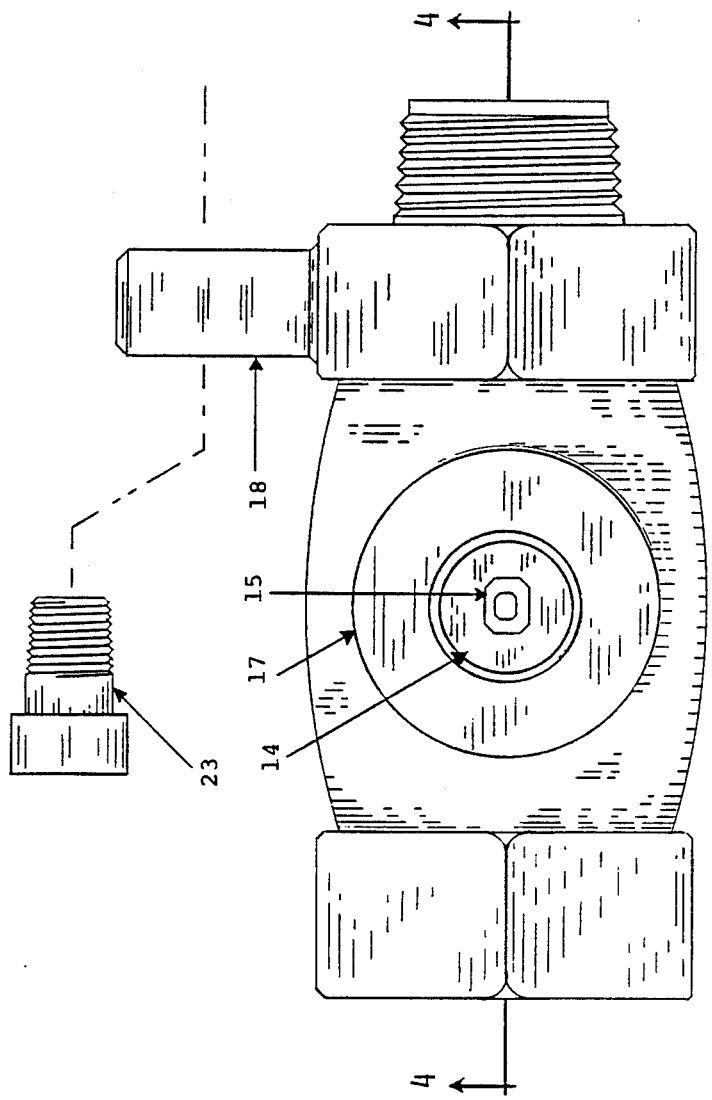
FIG. 3 is a top elevation view of a test cock.
Figure 4:
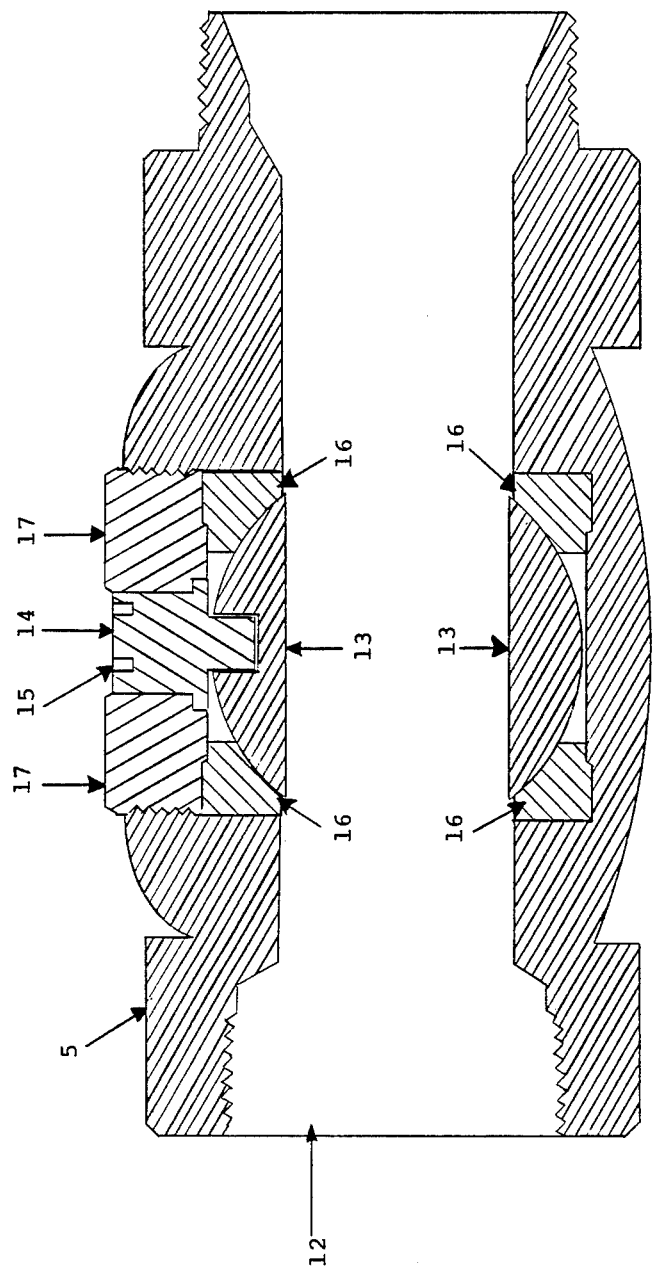
FIG. 4 is a side sectional view of a test cock taken along line 4—4 of FIG. 3.
Figure 6:
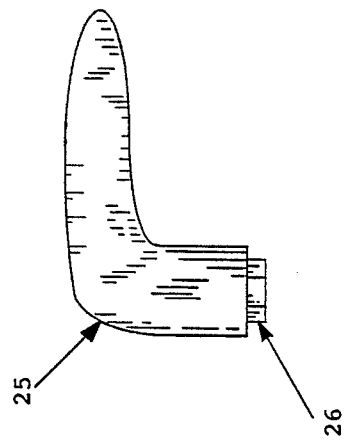
FIG. 6 is an elevation view of the tenon key.
Figure 5:
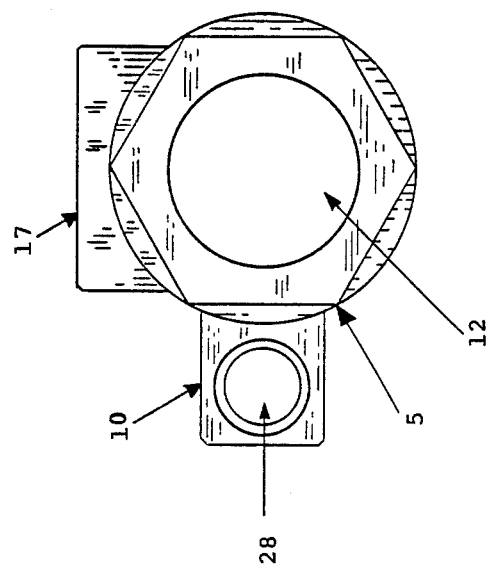
FIG. 5 is a front elevation view of a test cock.

Referring now to the drawings wherein like reference numerals refer to like and corresponding parts of throughout the several views, the preferred embodiment of the invention is disclosed in FIG. 1 through 6 inclusive.

The invention includes an upstream gate valve 1, downstream gate valve 2, between which is located a primary check valve 3, secondary check valve 4 and a zone differential pressure sensing valve 6 that monitors the pressure differential across the primary check valve 3, and, when this differential pressure decreases to within a given value, opens a relief valve 7 that discharges water between the primary check valve 3 and secondary check valve 4 through a discharge port 8, and allows air to enter through the air inlet valve 9 thereby preventing back siphonage.

Upstream of the upstream gate valve 1 is a test cock 5 that provides direct access to the water within the device. Another test cock 5 is located between the upstream gate valve 1 and the primary check valve 3. Another test cock 5 is located between the primary check valve 3 and the secondary check valve 4. Another test cock 5 is located between the secondary check valve 4 and the downstream gate valve 2. Due to the pressure gradient across the check valves, if a hose were connected to two or more test cocks, water would flow through the hose and entrain any liquid connected to the hose system. The variety of potential hazardous connections is numerous.

A test cock 5 comprises a test cock opening 12, ball valve 13, ball valve stem 14, ball valve seat 16, ball valve retainer 17, and the ball valve stem mortise 15 which prevents the test cock's ball valve stem 14 from being turned without the tenon key 25 which has a tenon 26 designed to mate with the ball valve stem mortise 15. This same tenon 26 may be used to secure the stem lock nut 22 with a stem lock nut mortise 11 to a gate valve stem 19 which prevents the gate valve handle 21 from being removed or the tubular extension sleeve 18 from being removed; the tubular extension sleeve 18 having a primary role of preventing closure of the upstream gate valve 1 which lies within the gate valve housing 20. To prevent the removal of a test cock 5 the securing bolt 23 locks the test cock 5 to the backflow prevention assembly body 27 by securing the test cock flange 10. The securing bolt 23 lies within the flange foramina 28 of the test cock flange 10 thereby preventing its removal without a tenon key 25. A tenon key 25 with tenon 26 that mates with the securing bolt mortise 24 of the securing bolt 23 is required to remove a test cock 5 from the backflow prevention assembly body 27.

I claim as my invention:

1. A testable backflow prevention assembly, provided with a means to access the water within the assembly by those authorized such access, comprising: an upstream gate valve, a primary check valve, a secondary check valve, a zone differential pressure sensing valve, a relief valve, a discharge port, a downstream gate valve, a test cock located upstream of the upstream gate valve, a test cock located between the upstream gate valve and the primary check valve, a test cock located between the primary check valve and the secondary check valve, and a test cock located between the secondary check valve and the downstream gate valve; wherein said test cocks are equipped with a locking valve such that a key is required to unlock and open the valve of the test cock, and, wherein, the test cocks are locked to the backflow prevention assembly body by means of a locking mechanism, said locking mechanism requiring a key in order to permit removal of a test cock from the backflow prevention assembly body.

2. The testable backflow preventing assembly of claim 1, wherein the locking valves of said test cocks are comprised of: a valve stem which actuates the valve of the test cock, wherein the valve stem is equipped with a mortise that mates with a tenon key such that the valve stem can not be moved without the tenon key.

3. The testable backflow prevention assembly of claim 1, wherein the means for locking a test cock to the backflow prevention assembly body comprises: a flange on the test cock for a securing bolt, a securing bolt with a securing bolt mortise which secures the test cock to the backflow prevention assembly body, said securing bolt requiring a tenon key for removal from the backflow prevention assembly body, thereby facilitating removal of said test cock.

4. A testable backflow prevention assembly, provided with a means to access the water within the assembly by those authorized such access, comprising: an upstream gate valve, a primary check valve, a secondary check valve, a downstream gate valve, a test cock located upstream of the upstream gate valve, a test cock located between the upstream gate valve and the primary check valve, a test cock located between the primary check valve and the secondary check valve, and a test cock located between the secondary check valve and the downstream gate valve; wherein said test cocks are equipped with a locking valve such that a key is required to unlock and open the valve of the test cock, and, wherein, the test cocks are locked to the backflow prevention assembly body by means of a locking mechanism, said locking mechanism requiring a key in order to permit removal of a test cock from the backflow prevention assembly body.

5. The testable backflow prevention assembly of claim 4, wherein the locking valves of said test cocks are comprised of: a valve stem which actuates the valve of the test cock, wherein the valve stem is equipped with a mortise that mates with a tenon key such that the valve stem can not be moved without the tenon key.

6. The testable backflow prevention assembly of claim 4, wherein the means for locking a test cock to the backflow prevention assembly body comprises: a flange on the test cock for a securing bolt, a securing bolt with a securing bolt mortise which secures the test cock to the backflow prevention assembly body, said securing bolt requiring a tenon key for removal from the backflow prevention assembly body, thereby facilitating removal of said test cock.

7. A testable backflow prevention assembly, provided with a means to access the water within the assembly by those authorized such access, comprising: an upstream gate valve, a primary check valve, an air inlet valve, a downstream gate valve, a test cock located between the upstream gate valve and the primary check valve, and a test cock located between the primary check valve and the air inlet valve; wherein said test cocks are equipped with a locking valve such that a key is required to unlock and open the valve of the test cock, and, wherein, the test cocks are locked to the backflow prevention assembly body by means of a locking mechanism, said locking mechanism requiring a key in order to permit removal of a test cock from the backflow prevention assembly body.

8. The testable backflow prevention assembly of claim 7, wherein the locking valves of said test cocks are comprised of: a valve stem which actuates the valve of the test cock, wherein the valve stem is equipped with a mortise that mates with a tenon key such that the valve stem can not be moved without the tenon key.

9. The testable backflow prevention assembly of claim 7, wherein the means for locking a test cock to the backflow prevention assembly body comprises: a flange on the test cock for a securing bolt, a securing bolt with a securing bolt mortise which secures the test cock to the backflow prevention assembly body, said securing bolt requiring a tenon key for removal from the backflow prevention assembly body, thereby facilitating removal of said test cock.

* * * * *